Oct. 10, 1950  G. HANKIN  2,525,453
ANIMAL WATERING FOUNTAIN
Filed April 16, 1948

INVENTOR.
George Hankin
BY Ross & Ross
Attys.

Patented Oct. 10, 1950

2,525,453

UNITED STATES PATENT OFFICE 2,525,453

ANIMAL WATERING FOUNTAIN

George Hankin, Southwick, Mass.

Application April 16, 1948, Serial No. 21,475

1 Claim. (Cl. 119—72)

This invention relates to improvements in animal watering fountains.

The principal object of the invention is the provision of a fountain for watering animals which is constructed and arranged in a novel manner, is efficient in its operation, and is economical in its manufacture.

Figure 1:
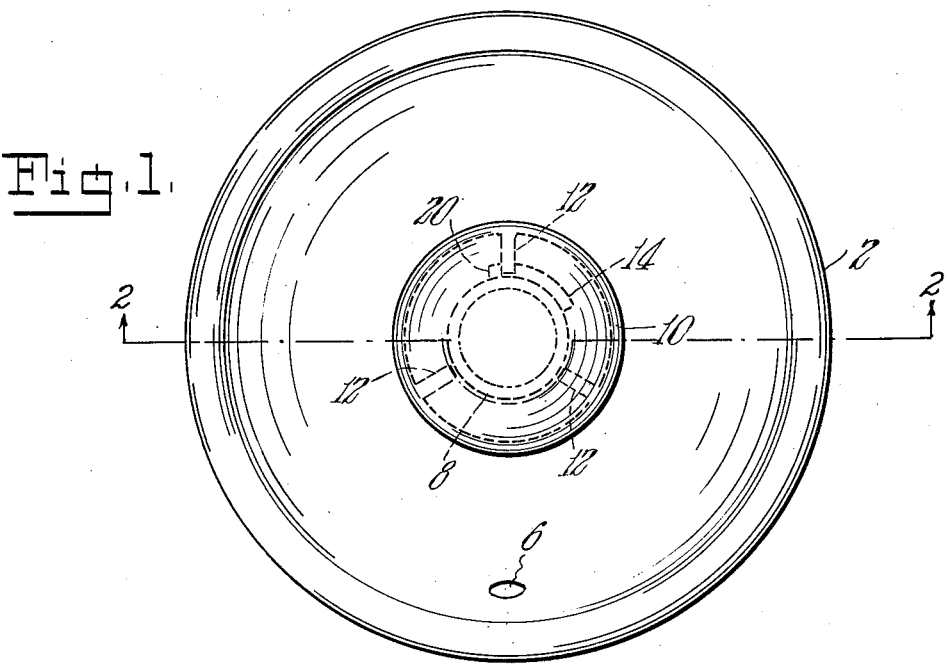
Figure 2:
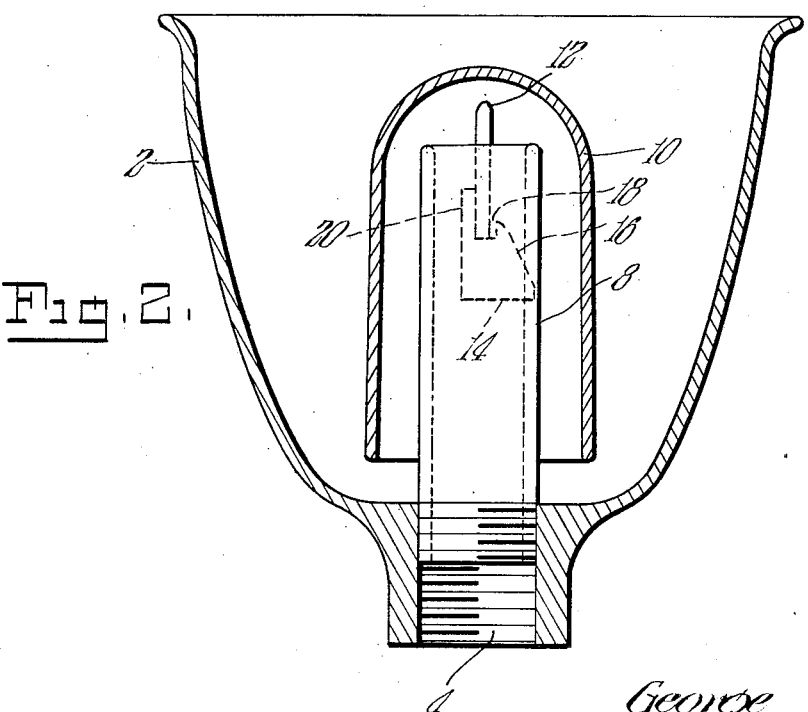

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a plan view of a fountain embodying the novel features of the invention; and Fig. 2 is a longitudinal sectional elevational view through the fountain shown in Fig. 1 on the line 2—2 thereof.

Referring now to the drawings more in detail, the invention will be fully described.

A receptacle 2 is provided which is in the form of a bowl. The receptacle has an outlet at the lower side thereof which may be threaded to engage a drain pipe by which the device may be supported. The device may be supported by any other means desired.

A water inlet 6 is provided which may be connected to a water supply in any desired manner.

An overflow pipe has its lower end disposed in the outlet 4 as shown.

A hood 10 in the form of an inverted cup which is preferably cylindrical surrounds the overflow 8.

Guide ribs 12 which are circumferentially spaced extend inwardly of the hood and loosely engage the overflow to space the hood from said overflow and permit up and down movements of said hood relative to said overflow. Thus the hood may be moved between an upper position thereof as shown and a lower position where the upper side thereof may abut the overflow at its upper end and close the same.

Means is provided for supporting the hood in upper position and includes a ledge member 14 on the outside. Said ledge includes an upper cam face 16 and a seat 18 at a side of which is a stop 20.

As shown, the lower end of one of the guide ribs 12 is disposed in the seat 18 and thereby the hood is held in upper position.

The hood may be elevated from the position shown so as to remove the rib 12 from the seat and then rotated so that the hood may be lowered to closed position.

Depending upon the number of animals using the device, the water supplied will be such as to maintain a level corresponding to the upper end of the overflow and more or less excess flowing out the overflow.

As more or less foreign matter is to be found in the bowl it is necessary and desirable to eliminate the same and this may be accomplished by flushing the bowl.

This may be accomplished by lifting, rotating and lowering the hood so that it closes the upper end of the overflow.

With the overflow closed, water is allowed to fill the bowl or approach its upper rim and when filled the hood is grasped for elevating it so as to open the upper end of the overflow.

When the overflow is open with water at a level thereabove there is a syphon action and water flows out the overflow to bring the level thereof below the upper end of the overflow.

The hood 10 may be lowered relative to the overflow 8 by sliding the lower edge of member 12 down along cam face 16. The lowering of the overflow 8 is controlled by the positioning of the same relative to the seat 18, the ledge 14, and the cam face 16 therebetween.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A watering device for animals comprising in combination, a bowl having an upper rim and a drain outlet in the lower side thereof, an overflow pipe fixed to and extending upwardly in said bowl from the drain outlet and having an open upper end disposed in a plane below that of the upper rim of said bowl, an inverted cup shaped tubular hood having closed upper and open lower ends for surrounding said overflow pipe, a ledge member spaced around the outer side of said overflow pipe having an upper cam face extending upwardly and rearwardly from a lower side thereof and terminating in a seat, and guide ribs spaced around and extending inwardly from the inner side of said hood having lower ends adapted to engage said cam face as said hood is turned in one direction about said overflow pipe thereby to elevate said hood upon rotation thereof.

GEORGE HANKIN.

REFERENCES CITED

The following references are of record in the file of this patent:

UNITED STATES PATENTS

| Number | Name | Date |
|---|---|---|
| 399,506 | Dwyer | Mar. 12, 1889 |
| 688,862 | Kelly | Dec. 17, 1901 |
| 1,226,758 | Dufty | May 22, 1917 |
| 1,320,472 | Jarboe et al. | Nov. 4, 1919 |
| 1,503,736 | Wilson | Aug. 5, 1924 |
| 1,866,431 | Swindler | July 5, 1932 |

FOREIGN PATENTS

| Number | Country | Date |
|---|---|---|
| 8,343 of 1927 | Australia | Dec. 1, 1927 |